United States Patent
Lou et al.

(10) Patent No.: US 6,495,065 B1
(45) Date of Patent: Dec. 17, 2002

(54) NITROSAMINE-INHIBITING COMPOSITIONS FOR SHORTSTOPPING OF FREE RADICAL EMULSION POLYMERIZATIONS

(75) Inventors: Jianfeng Lou, Upper Merion, PA (US); Thomas S. Buszta, Pottstown, PA (US); Michael D. Gernon, Upper Providence, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/631,756

(22) Filed: Aug. 3, 2000

Related U.S. Application Data

(60) Provisional application No. 60/153,150, filed on Sep. 9, 1999.

(51) Int. Cl.[7] .............................. C09K 3/00; C08F 2/38
(52) U.S. Cl. .................... 252/183.12; 525/267; 526/83; 526/84
(58) Field of Search ..................... 526/83, 84; 525/267; 252/183.12

(56) References Cited

U.S. PATENT DOCUMENTS

| | | | |
|---|---|---|---|
| 4,965,326 A | * | 10/1990 | Hörpel et al. |
| 5,070,130 A | | 12/1991 | Dwight |
| 5,087,671 A | * | 2/1992 | Loeppky et al. |
| 5,177,164 A | | 1/1993 | DeVries et al. |
| 5,384,372 A | | 1/1995 | Lattime |
| 5,504,168 A | | 4/1996 | Maestri et al. |
| 5,807,542 A | * | 9/1998 | Challis et al. |
| 5,880,230 A | * | 3/1999 | Syrinek et al. |
| 6,090,414 A | * | 7/2000 | Passwater et al. |
| 6,187,857 B1 | * | 2/2001 | Ozawa et al. |

FOREIGN PATENT DOCUMENTS

| | | |
|---|---|---|
| DE | 3939474 | 6/1991 |
| DE | 295646 | 11/1991 |
| EP | 482470 | 4/1992 |
| EP | 0727458 | 8/1996 |
| WO | 97/32927 | 9/1997 |

OTHER PUBLICATIONS

Yen, T. B., Et Al., "Block Nitrosamine Formation With Polymers," Chem. Res. Toxicol., American Chemical Society, p. 382–389, (Aug. 9, 1991).

* cited by examiner

*Primary Examiner*—Tae H. Yoon
(74) *Attorney, Agent, or Firm*—Gilbert W. Rudman

(57) ABSTRACT

The present invention is a composition for and a method of shortstopping free radical emulsion polymerizations that inhibits the formation of nitrosamines. The composition comprised nitrosamine inhibitors in combination with conventional alkylhydroxylamine shortstoppers. Such nitrosamine inhibitors are based on primary amines, amine-containing polymers, pyrroles, hydroquinones, certain phenols, ascorbic acid, and other well-known nitrosation inhibitors; they may be used individually or as a blend. The compositions are targeted for applications in the emulsion processes for producing rubber latexes and the preparation of rubber products thereafter.

2 Claims, No Drawings

NITROSAMINE-INHIBITING COMPOSITIONS FOR SHORTSTOPPING OF FREE RADICAL EMULSION POLYMERIZATIONS

REFERENCE TO RELATED APPLICATION

This application claims the benefit of U.S. Provisional Application Ser. No. 60/153,150, filed Sep. 9, 1999.

BACKGROUND OF THE INVENTION

1. Field of the Invention

The present invention is a composition for shortstopping free radical emulsion polymerizations and which inhibits the formation of nitrosamines, and a method using such compositions.

2. Description of the Prior Art

In summary, the prior art in this area discloses methods of reducing the level of nitrosamines in both rubber latexes and cured rubber products. For rubber latexes, efforts have focused on the use of alternative alkylhydroxylamine shortstoppers that do not contain and generate nitrosamine precursors (e.g., secondary or tertiary alkylamines). Such shortstoppers include N-isopropylhydroxylamine (NiPHA) or salts thereof, optionally mixed with polysulphide compounds. The use of NiPHA-based shortstoppers greatly reduces the level of nitrosamines in rubber latexes, but it presents new problems, typically, a lack of overhead popcorn (namely undesired polymer) protection. As for cured rubber compositions, alternative vulcanization accelerators have been proposed which result in reduced nitrosamine formation, and various nitrosamine inhibitors have been incorporated into the formulation of rubber vulcanizers. These previous inventions include the following:

Chasar, D. W.; U.S. Pat. No. 5,070,130 1991 (The B. F. Goodrich Company) disclosed the use of alkaline earth oxide or hydroxide to reduce nitrosamines level in cured rubber compositions.

Bao, T. B.; Loeppky, R. N.; Chem. Res. Toxicol. 4, 382–9, 1991 described the use of polymers that contain nitrosation-reactive functional groups to block the nitrosation of morpholine by nitrous acid. Examples of such polymers include polyethylenimine and its derivatives.

Eisenbrand, G.; DE Patent No. # 3,939,474 1991 (Fed. Rep. Ger.) disclosed the use of polyethyleneimine to inhibit the formation of nitrosamines such as N-nitrosodiethanolamine in hydraulic fluids, and cosmetic/lubricant formulations.

Schmieder, H.; Naundorf, D.; Huehn, G.; Bertram, M.; DD Patent # 295,646 1992 (Buna A.-G., Germany) described a method of preparing synthetic rubber with greatly reduced level of carcinogenic nitrosamines. Such rubber latexes were prepared by emulsion polymerization of butadiene and optionally acrylonitrile or styrene in the presence of a reducing sulfonyl compound.

Thoermer, J.; Scholl, T.; EP Patent # 0,482,470 1992 (Bayer A.-G., Germany) described a method of inhibiting nitrosamine formation during vulcanization of rubber. The method involved the use of half esters of maleic or fumaric acid or their salts as nitrosamine inhibitors.

De Vries, S. M.; Willemsen, J. A. M.; U.S. Pat. No. 5,177,164 1993 (Shell Oil Company) disclosed a process of shortstopping free radical polymerizations using alkali metal polysulphides. Such shortstoppers did not lead to the generation of carcinogenic nitrosamines in the polymeric product.

Lattime, R. R.; U.S. Pat. No. 5,384,372 1995 (The Goodyear Tire & Rubber Company) disclosed a method of shortstopping free radical emulsion polymerizations that does not lead to the generation of volatile nitrosamines. The shortstopper was isopropylhydroxylamine or salts thereof. Specific claims were made for such shortstoppers in the emulsion process of preparing synthetic rubber latexes where the formation of nitrosamines was suppressed in the rubber latexes.

Maestri, P.; Presti, A. L.; U.S. Pat. No. 5,504,168 1996 (Enichem Elastomeri S.r.l.) described a method of shortstopping emulsion polymerizations of conjugated dienes and optionally vinyl aromatic compounds. The disclosed method used a composite of isopropylhydroxylamine (or salts thereof) and sodium polysulfide as shortstopper where such composites did not result in nitrosamines in the polymeric product.

Stein, G.; von Arndt, E.-M.; EP Patent # 0,727,458 1996 (Firma Carl Freudenberg, Germany) disclosed the use of mono- or polyisocyanate to suppress the generation of nitrosamines during rubber processing. Such isocyanate compounds inhibit the formation of amines and thus nitrosamines.

Gibbs, H. W.; Butcher, D. M. E.; Tate, P. E. R.; Sexton, G. P.; WO Patent # 9,732, 927 1997 (Rhone-Poulenc Chemicals Ltd., UK) described a process of inhibiting the formation of nitrosamines during vulcanization of rubber using an alkaline earth metal carboxylate or phenylate. Such compounds are incorporated into the rubber vulcanization formulation to suppress the nitrosamine formation.

Additionally in the prior art, for most emulsion processes, especially those of styrene-butadiene rubber (SBR) latexes, DEHA (often with a secondary shortstopper such as SDDC) has been widely used due to its unique shortstopping performance. A major problem associated with the use of DEHA is the possible generation of nitrosamines, as DEHA may contain (as an impurity) or generate secondary/tertiary amines that are nitrosamine precursors. In order to overcome this problem, some replacements such as NiPHA have been proposed which do not produce nitrosamines in rubber latexes. Such replacements, however, do not prevent popcorn formation in the vapor phase, and as a result, DEHA is often supplemented to enhance the vapor phase popcorn protection. The present shortstopping technology is novel in that nitrosamine inhibitors are formulated into shortstoppers so that conventional alkylhydroxylamines such as DEHA could be used to shortstop emulsion polymerizations without generating nitrosamines.

As DEHA and its like appear to be the most widely used shortstopper in the modern rubber industry, the possible generation of nitrosamines could be a severe problem with previous shortstopping compositions. The present invention represents an advance in shortstopping technology in that the presence of nitrosamine inhibitors allows the exploitation of many unique characteristics of DEHA and other shortstoppers without leading to nitrosamines in rubber latexes.

The objective of this invention is to develop improved shortstopping compositions which allow the use of traditional dialkylhydroxylamines such as DEHA but inhibit the formation of nitrosamines. Such compositions are based on the use of nitrosamine inhibitors that effectively remove nitrosating species from the polymerization system, and these inhibitors can be retained in the rubber latex to suppress the formation of nitrosamines not only in the emulsion but also in the subsequent operating phases.

SUMMARY OF THE INVENTION

The present invention discloses an advanced shortstopping technology where nitrosamine inhibitors are formulated into shortstopping compositions. Such inhibitors include compounds based on primary amines, amine-containing polymers, certain phenols, and other well-known nitrosation inhibitors; they allow the use of conventional shortstoppers such as DEHA without generating nitrosamines.

Examples of the disclosed inhibitors include mono-(C2–C16)alkylamine, polyethylenimine (PEI) and its derivatives, pyrrole (or indole) and its derivatives, hydroquinone (or catechol) and its derivatives, ascorbic acid and its derivatives, and polyoxymethylene and its derivatives.

DETAILED DESCRIPTION OF THE INVENTION

The present invention distinguishes itself from previous disclosures in that nitrosamine inhibitors are incorporated into the shortstopping compositions, and these inhibitors are introduced to rubber latexes during polymerization, rather than to vulcanization formulations during rubber processing. The presence of nitrosamine inhibitors in the shortstopping compositions allows the use of conventional diethylhydroxylamine (DEHA) as well as some other shortstoppers that may contain or produce secondary or tertiary alkylamines without formation of nitrosamines; it presents a tremendous advance in shortstopping technology where many advantages of such shortstoppers can be exploited.

While not intending to limit the scope of invention, we believe that the underlying chemistry of these nitrosamine inhibitors could involve (1) conversion of nitrosating species into small molecules without nitrosation capability, (2) conversion of nitrosating species into heavy nitrosamines that are not carcinogenic, and (3) reduction in the level of nitrosamine precursors.

The developed compositions are targeted for applications in shortstopping free radical emulsion polymerizations of conjugated dienes (such as butadiene) and optionally vinyl monomers (such as styrene and acrylonitrile).

A particular benefit of the disclosed shortstopping technology is the exploitation of various advantages of conventional shortstoppers with inhibited nitrosamines. Conventionally used DEHA, for example, exhibits unique performance as shortstopper. Compared to the alternative NiPHA, DEHA is much more effective inhibiting popcorn formation in vapor phase, more stable and less corrosive. The solubility of DEHA in water (~85 wt. %) is greatly higher than that of NiPHA (~15 wt. %), which translates to a lower shipping cost for DEHA than NiPHA as these compounds are normally transported as aqueous solutions. The presence of nitrosamine inhibitors would also allow the use of other alkylhydroxylamines.

The alkylhydroxylamine shortstoppers have the following general formula:

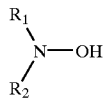

wherein $R_1$ and $R_2$ may the same or different. $R_1$ and $R_2$ may be hydrogen, alkyl, hydroxyalkyl, alkoxyalkyl, and sulfonated alkyl groups, and wherein the alkyl group may contain C1–20 abd be linear m branced or cyclic. However $R_1$ and $R_2$ together may not be H, or a H and a methyl.

Another advantage of the present shortstopping strategy is that the incorporated nitrosamine inhibitors would suppress the formation of nitrosamines throughout rubber manufacturing, from rubber latex to cured rubber product.

Preferably, the nitrosamine inhibitor is incorporated into the shortstopper, and the formulated shortstopper, usually in a solvent medium, is introduced to the polymerization system at a targeted conversion. The nitrosamine inhibitor could include one or more than one compound, each being at a level of 0.01–2 parts per hundred (pph) of shortstopper. The shortstopper itself could be one or more alkylhydroxylamines and optionally one or more secondary shortstopping agents such as sodium dimethyldithiocarbamate (SDDC). Typically, the shortstopper is used between 0.02 and 0.5 pph of monomer initially charged into the polymerization system. The solvent medium is normally water and optionally one or more organic solvents such as methanol.

In a variant of the current invention, nitrosamine inhibitors could be introduced into the polymerization system separately from shortstoppers. The nitrosamine inhibitors could be charged in the beginning of the reaction, or they could be added during the course of polymerization before it reaches the desired conversion. In the case that a composite nitrosamine inhibitor is used, each component could also be added separately.

The present shortstopping technology is applicable to a variety of emulsion processes involving rubber latexes. The targeted emulsion processes include polymerizations of conjugated dienes, particularly, 1,3-butadiene, isoprene, chloroprene and the like, and copolymerizations of such dienes with monoolefin compounds, for example, styrene, acrylonitrile, acrylic acid, vinyl chloride and the like.

The disclosed shortstopping strategy can be extended to any polymerization systems where shortstoppers are used that may contain or produce nitrosamine precursors.

These alternatives are presented based on theory and analogy.

EXAMPLE 1

SBR latexes were synthesized by free radical emulsion polymerizations, and NiPHA was used to shortstop the emulsion processes. The polymerization was based on a cold soap SBR recipe as follows:

| Material | Parts[a] |
| --- | --- |
| Styrene | 28.0 |
| 1,3-Butadiene | 72.0 |
| Deionized water | 200.0 |
| Surfactant | 4.5 |
| Electrolyte | 0.30 |
| NaFe (chelated iron complex) | 0.02 |
| Sodium formaladehyde sulfoxylate | 0.08 |
| TDM[b] | 0.30 |
| Organic peroxide | 0.05–0.10 |
| KOH[c] | Variable |

[a]Parts by weight per 100 parts of monomer charged.
[b]Tertiary dodecyl mercaptan
[c]The pH was adjusted to 10.5–10.9 by KOH.

The polymerizations were performed at 10–12° C. to ~60% conversion, then NIPHA was added to the reactor to shortstop the polymerization reactions. Unreacted butadiene and styrene were removed before the SBR latex was recovered, and the presence of nitrosamines in the latex was analyzed by gas chromatography using a thermal energy analyzer. Such latexes were coagulated by the use of dilute sulfuric acid and a mixture of methanol/flexzone, and the obtained crumb rubber was dried and rolled in the absence of other additives. The final rubber sample was again analyzed for nitrosamines.

Three SBR polymerization runs were performed where monoethylamine (MEA) and PEI were evaluated as nitrosamine inhibitor. Run 1 was a control experiment where 400 ppm NIPHA (based on the amount of SBR latex) was used to shortstop the polymerization, and Run 2 and Run 3 were similar to Run 1 other than that 1000 ppm MEA and 1000 ppm PEI (based on the amount of NIPHA) were incorporated into NIPHA, respectively. Nitrosamines were analyzed for both the latex (unreacted monomers removed) and the rubber (rolled) samples, and the results are presented in Table 1. Table 1 shows that NIPHA does not yield nitrosamines in SBR latexes but does lead to nitrosamines in SBR rubber, and both MEA and PEI inhibit the generation of nitrosamines in SBR rubber. The formation of nitrosamines in SBR rubber is probably due to the generation of nitrosamine precursors during the processes of latex coagulation and rubber processing.

TABLE 1 [a]

| Short-stopper | Inhibitor in NiPHA | Inhibitor in latex | Nitrosamine in latex | Nitrosamine in rubber |
|---|---|---|---|---|
| 400 ppm NiPHA | 0 | 0 | ND [b] | 7 ppb NDMA[c] |
| 400 ppm NiPHA | 1000 ppm MEA | ~400 ppb MEA | ND | 4 ppb NDBA[d] |
| 400 ppm NiPHA | 1000 ppm PEI | ~400 ppb PEI | ND | 4 ppb NDBA |

[a] The limit of detection is 1 ppb.
[b] None detected
[c] N-nitrosodimethylamine
[d] N-nitrosodibutylamine

EXAMPLE 2

The experimental procedures were similar to Example 1, but DEHA and DBHA were used as shortstopper instead of NIPHA. Three polymerization runs were performed where diethylamine (DEA, a nitrosamine precursor) was maintained at ~450 ppb (based on the amount of latex), and MEA and PEI were evaluated for their performance as nitrosamine inhibitor. Table 2 shows the nitrosamine results for these experiments. The results in Table 2 indicate that the presence of MEA and PEI greatly reduces the level of nitrosamines in SBR rubber. PEI, specifically, yielded a nitrosamine-free SBR rubber.

TABLE 2 [a]

| Short-stopper | Inhibitor in Short-stopper | Inhibitor in latex | Nitrosamine in latex | Nitrosamine in rubber |
|---|---|---|---|---|
| 200 ppm DEHA 200 ppm DBHA | 0 | 0 | NA [b] | 6 ppb NDBA [c] 3 ppb NDMA [d] |
| 350 ppm DEHA | 1250 ppm MEA | ~450 ppb MEA | 1 ppb NDMA 2 ppb NDEA[e] | 3 ppb NDBA |
| 200 ppm DEHA 200 ppm DBHA | 1125 ppm PEI | ~450 ppb PEI | NA | ND [f] |

[a] The limit of detection is 1 ppb.
[b] Not available
[c] N-nitrosodibutylamine
[d] N-nitrosodimethylamine
[e] N-nitrosodiethylamine
[f] None detected

EXAMPLE 3

The experimental details were similar to Example 2, but DEHA with a higher level of nitrosamine precursors (1900 ppm DEA and 400 ppm triethylamine, TEA) was used as shortstopper. Seven polymerization runs were performed where MEA, monoisopropylamine (MiPA), monobutylamine (MBA), monoamylamine (MAA) and PEI were evaluated as nitrosamine inhibitors. Table 3 presents the nitrosamine results, and the results indicate that the presence of such amine-based inhibitor(s) dramatically reduces the nitrosamines level, and nitrosamine-free SBR latex and rubber products could be produced with various combinations of the afore-mentioned inhibitors.

TABLE 3

| Short-stopper | Nitrosamine precursor in short-stopper | Inhibitor in short-stopper | Nitrosamine in latex | Nitrosamine in rubber |
|---|---|---|---|---|
| 400 ppm DEHA | 1900 ppm DEA 400 ppm TEA | 0 | 1.3 ppb NDEA [a] | 17 ppb NDEA 72 ppb NDPA [b] 110 ppb NDBA [c] 86 ppb NPIP [d] <100 ppb NPYR [e] 62 ppb NMOR [f] |
| 400 ppm DEHA | 1900 ppm DEA 400 ppm TEA | 1 wt % MEA 1 wt % MBA 1 wt % MAA | ND [g] | ND [h] |
| 400 ppm DEHA | 1900 ppm DEA 400 ppm TEA | 1 wt % MiPA 1 wt % MBA 1 wt % MAA | ND [g] | ND [g] |
| 400 ppm DEHA | 1900 ppm DEA 400 ppm TEA | 0.8 wt % PEI | ND [g] | ND [g] |
| 400 ppm DEHA | 3000 ppm DEA[i] 400 ppm TEA | 1 wt % MEA 1 wt % MBA 1 wt % MAA | 1.5 ppb NDEA | ND [h] |
| 400 ppm DEHA | 3000 ppm DEA[i] 400 ppm TEA | 0.3 wt % PEI 1 wt % MBA | ND [g] | ND [h] |
| 400 ppm DEHA | 3000 ppm DEA[i] 400 ppm TEA | 1 wt % MiPA 1 wt % MBA 1 wt % MAA 0.1 wt % PEI | ND [g] | ND [h] |

[a] N-nitrosodiethylamine
[b] N-nitrosodipropylamine
[c] N-nitrosodibutylamine
[d] N-nitrosopiperidine
[e] N-nitrosopyrrolidine, the limit of detection is 100 ppb due to an interference.
[f] N-nitrosomorpholine
[g] None detected, the limit of detection is 1 ppb.
[h] None detected, the limit of detection is 2 ppb.
[i] DEA level is spiked to 3000 ppm.

What is claimed is:

1. A composition for shortstopping free radical emulsion polymerizations, wherein the composition contains a nitrosamine inhibitor and a shortstopper; wherein the inhibitor is a mono-($C_2$–$C_{16}$)alkylamine, polyethylenimine, pyrrole, indole, ascorbic acid, or polyoxymethylene; and
wherein the shortstopper is an alkylhydroxylamine having the following general formula:

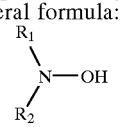

wherein $R_1$ and $R_2$ are independently hydrogen, $C_{2-20}$ alkyl, hydroxy $C_{2-20}$ alkyl, $C_{2-20}$ alkoxy $C_{2-20}$ alkyl, and sulfonated $C_{2-20}$ alkyl groups, and they could be cyclic or branched, with the proviso that $R_1$ and $R_2$ may not concurrently be H, or a H and a methyl.

2. The composition of claim 1 wherein the shortstopper is diethylhydroxylamine and/or dibutylhydroxylamine.

* * * * *